WARREN E. JOHNSON, OF CHICAGO, ILLINOIS.

Letters Patent No. 88,258, dated March 23, 1869.

IMPROVED PROCESS OF DERIVING USEFUL PRODUCTS FROM GARBAGE, &c.

The Schedule referred to in these Letters Patent and making part of the same.

*To all whom it may concern:*

Be it known that I, WARREN E. JOHNSON, of Chicago, Cook county, in the State of Illinois, have invented a new and improved mode, or process of first separating the grease, or fat from the garbage from hotels, boarding-houses, and other places, and the distillation, from the residuum, of high-wines, or spirituous liquor; and I do hereby declare that the following is the full and exact description thereof.

The nature of my invention consists in this, that the swill, refuse, or garbage of towns or cities, otherwise useless, and liable to become offensive by decomposition, and which would probably produce obstructions of the public sewers, if thrown into them, are to be collected from hotels, boarding-houses, and private dwellings, by conveyances properly arranged for the purpose, and which will prevent offence to the community.

Arriving at the place for treatment, the largest bones are to be selected out, by such process of separation as may be found to be convenient. The rest of the material, not so separated, is to be elevated into proper tanks, or vats, for further treatment.

This further treatment consists, first, in the thorough crushing and mixing of the garbage left, after removal of the larger bones.

The material so crushed and thoroughly admixed, is to be introduced into a mash-tub, so arranged, that by the application of steam, any desirable temperature, below or above the boiling-point of water, can be obtained at pleasure.

After submission to the effects of steam-heat for such time, and at such temperature as may be required for the complete separation of grease, fats, or oils, the contents of the mash-tub are to be drawn off into settling-vats, to permit, by repose, the separation of grease, fat, or oil, from the watery solution.

This solution is then to be separated from the fatty matters, by the ordinary methods of separation, as practised.

The watery solution, or mash, after such separation, is to be cooled to the usual heat required for the action of yeast, to produce the alcoholic fermentation, as usually practsied in distilleries or breweries.

Yeast is then to be added, and fermentation effected by the usual process for fermenting and effecting alcoholic fermentation, as usually practised in well-conducted breweries or distilleries.

The product of the fermentation is then to be treated in the same way, or in a similar manner, (by apparatus properly constructed, and arranged to give the best results,) as usually conducted in distilleries having for the object the production of high-wines, or of alcohol, with such additional arrangements as the United States government may prescribe for the collection of the internal-revenue tax on distilled spirits.

Instead of utilizing, by fermentation, merely the saccharine matter already present in the garbage, the mass, when largely made up of amylaceous ingredients, such as parcels of bread, pies, cakes, &c., may be converted into glucose by the action of malt, or by boiling with dilute sulphuric acid, in the manner generally practised.

The sugary liquid thus obtained from starch, is separated from insoluble matters by straining, fermented by the addition of yeast, and the alcohol secured by distillation.

After having fully described my invention,

What I claim, is—

The utilization of garbage, or refuse material collected from hotels, boarding-houses, and private dwellings, and the production therefrom of valuable materials, substantially by the process detailed in the specification, as above.

WARREN E. JOHNSON.

Witnesses:
 GEO. C. BATES,
 A. B. COTES.